Jan. 29, 1957     E. R. DAVIS     2,779,215
SAW SET

Filed Aug. 25, 1955     2 Sheets-Sheet 1

*INVENTOR.*
ELWOOD R. DAVIS

BY

ATTORNEYS

Jan. 29, 1957   E. R. DAVIS   2,779,215
SAW SET
Filed Aug. 25, 1955   2 Sheets-Sheet 2
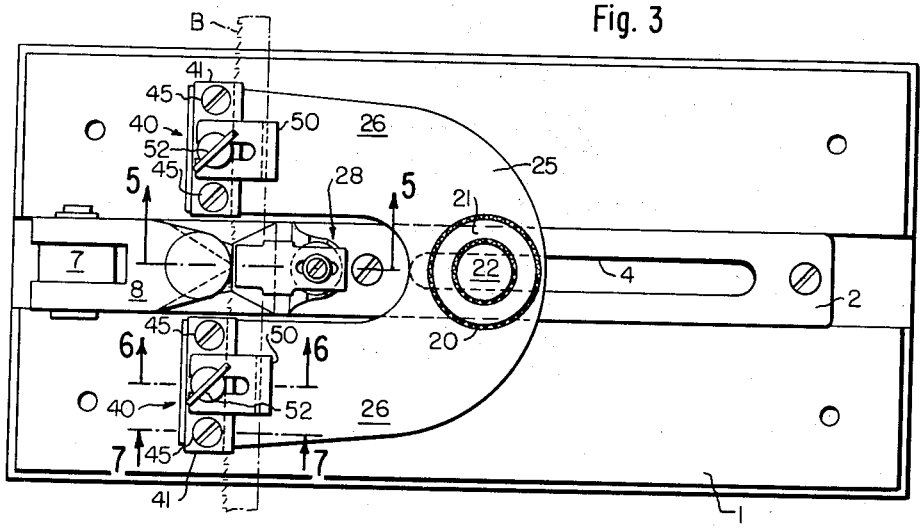
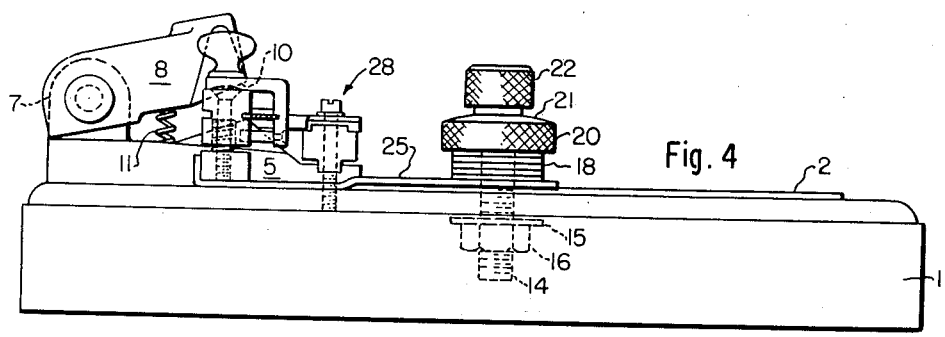
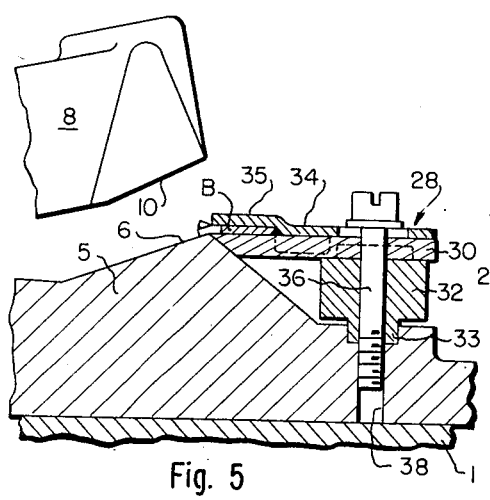
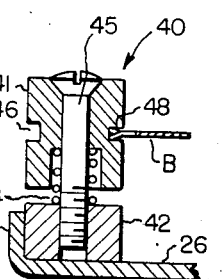
INVENTOR.
ELWOOD R. DAVIS
BY
ATTORNEYS

United States Patent Office 2,779,215
Patented Jan. 29, 1957

2,779,215

SAW SET

Elwood R. Davis, Keene, N. H., assignor to Harrington & Richardson, Inc., Worcester, Mass., a corporation of Massachusetts Application August 25, 1955, Serial No. 530,549

4 Claims. (Cl. 76—65)

The principal object of the present invention is to provide a saw set which is not only capable of adjustment so as to secure different degrees of set, but which may be used on different types of saws such as circular and flat saws, band saws, etc.

Further objects relate to features of construction and will be apparent from a consideration of the following description and the accompanying drawings wherein:

Fig. 3 is a top plan view showing the device set up to operate on a band saw;

Fig. 4 is a side elevation of the saw set shown in Fig. 3;

Fig. 5 is an enlarged section on the line 5—5 of Fig. 3;

Fig. 6 is an enlarged section on the line 6—6 of Fig. 3; and

Fig. 7 is an enlarged elevation on the line 7—7 of Fig. 3.

Figure 1:
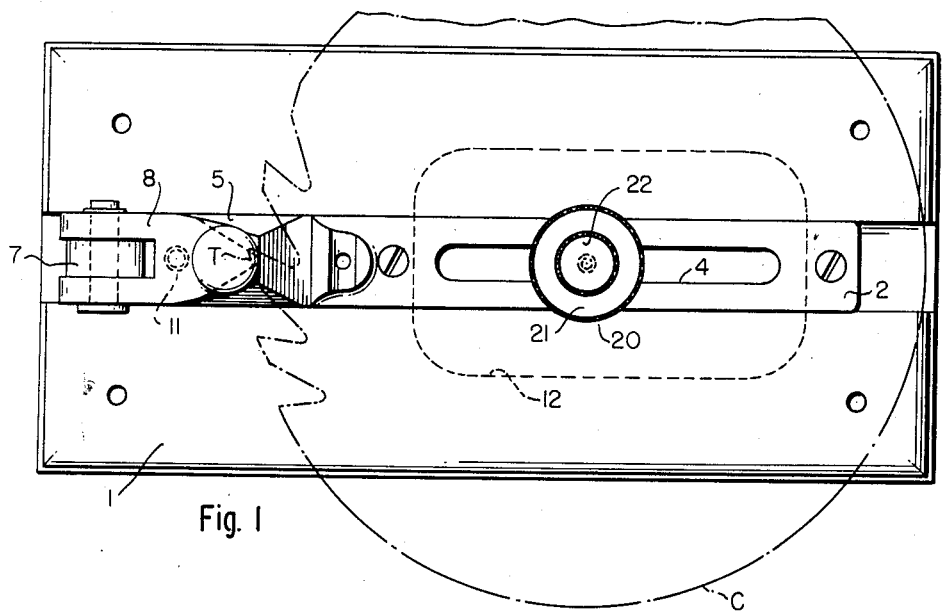
Fig. 1 is a top plan view of a saw set constructed in accordance with the present invention and set up to operate on a circular saw.
Figure 2:
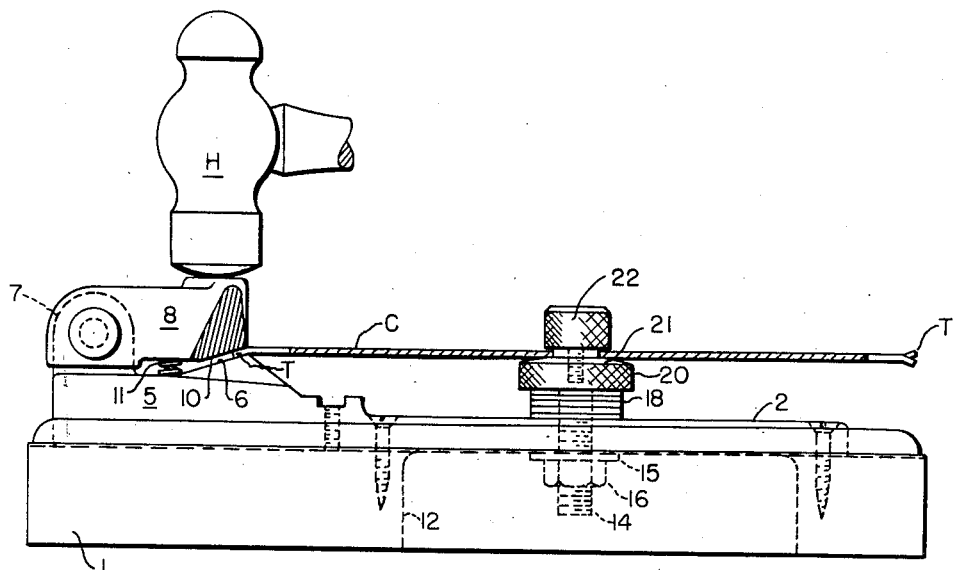
Fig. 2 is a side elevation of the saw set shown in Fig. 1.

Referring to Figs. 1 and 2, the embodiment therein shown comprises a base 1 which may be of wood or other suitable material, the upper surface of which is longitudinally recessed to receive a steel strip 2 which is slotted at one end as indicated by the reference numeral 4, and adjacent to its opposite end the strip is integral with an anvil 5 having an inclined and tapered operating surface 6. The outer end of the strip 2 is integral with an upstanding lug 7 which pivotally supports a finger or strike 8, the free end of which is formed with an inclined tapered surface 10 corresponding to the surface 6, both of which surfaces are appropriately hardened. The strike 8 is normally held in elevated position by a small compression spring 11 (Figs. 2 and 4).

The underside of the base 1 is also recessed as indicated at 12 so as to receive the lower end of a stud 14 which projects outwardly through the slot 4. The lower end of the stud 14 carries a clamping washer 15 which acts against the underside of strip 2 and a locking nut 16, and above the strip 2 this stud carries a plurality of spacers 18, a saw support 20 having a convex saw-engaging surface 21, and a headed member 22 threaded into the support 20 so as to hold a circular saw blade C properly centered.

The construction and arrangement of parts are such that the stud 14, saw support 20 and associated parts are movable as a unit toward and away from the anvil 5 and strike 8 so that circular saws of different diameters may be properly positioned with a selected tooth on the surface 6, as illustrated in Figs. 1 and 2; and furthermore the level or angular position of the saw C relative to the anvil 5 may be varied by removing or inserting spacers 18.

Where, as here shown, the blade C is held parallel to the base 1, the set imparted to a selected tooth T for a given blow of the hammer H on the strike 8, will depend on the angle of inclination of the surfaces 6 and 10. However, the angular position of the saw blade may also be used to achieve a greater or lesser set. For example, the insertion of more spacers 18 will cause the blade to incline so that a lesser set is secured when the strike hits a tooth in response to a blow from the hammer H, but on the other hand, removal of some of the spacers 18 causes the blade to tilt so that its teeth receive a greater set.

In using the device on circular saws the lug 14 and associated parts are first adjusted so as to hold the saw at the proper elevation with the tip portion of one of its teeth on the surface 6, and the member 22 is then tightened sufficiently to prevent objectionable looseness. The hammer H is then brouht down on the srike 8 to set the tooth, after which the operation is repeated on alternate teeth. The saw is then reversed and the operation repeated on the unset teeth.

The embodiment shown in Figs. 3 to 7 is the same as that above described, except for the saw supporting adapter 25, and the same reference characters are applied to like parts. In this embodiment the closed end of the U-shaped adapter 25 is provided with an opening through which the stud 14 projects and may thus be clamped in fixed position by the nut 16. The legs 26 of the adapter are formed with upturned ends 27 and embrace the anvil 5, strike 8 and also a positioning device or clip 28.

The positioning device comprises a flat plate 30 mounted on a small block 32 having a reduced end 33 fitting into a recess in the base of the anvil 5. On top of the plate 30 is a slotted clip 34 having an offset end 35 defining a horizontally extending recess in which a band saw blade B snugly fits, the assemblage being held together by a clamping screw 36 which passes through the slot in the clip 34, plate 30 and block 32 into a threaded opening 38 in the anvil 5. The construction and arrangement of parts are such that when the band saw B is disposed in the recess defined by the plate 30 and clip 34 its teeth are properly held in operative position on the surface 6 of the anvil, as shown in Figs. 3 to 5, and hence when the strike 8 descends upon a tooth so positioned, it is bent or set according to the angle of inclination of the surface 6.

Carried by the end portions of the legs 26 of adapter 25 and aligned with the clip 28 is a pair of guides 40 (Figs. 6 and 7) each of which comprises upper and lower blocks 41 and 42 extending transversely of the legs 26, the lower block 42 being disposed against the upturned end 27 and suitably secured to the leg 26. The underside of the opposite ends of each of the blocks 41 are recessed to receive coil springs 44 (Fig. 7) and clamping screws 45 extend through the blocks and coil springs into threaded openings in the blocks 42, thus holding the parts together so as to permit the level of the upper blocks to be adjusted. The opposite sides of the upper block 41 are provided with elongate horizontal slots 46 and 48, the slots 48 being horizontally aligned with the recess defined by the offset 35 of the clip 34.

Between each pair of clamping screws 45 is a holding device for band saw B, which comprises an inverted L-shaped finger 50, the upper part of which is slotted to accommodate the shank of a wing clamping screw 52 which is threaded into the block 41, as shown in Fig. 6. The depending end of the finger 50 carries an inwardly extending guide lug 54 (Fig. 6) which has a sliding fit into a transverse opening 55 in the block 41, and the inner face of this depending part is provided with a horizontal slot 56 aligned with the slot 48. With this construction and arrangement of parts the holding finger 50 may be adjusted toward and away from the block 41 so as to accommodate jig and band saws of different widths.

In using the adapter for setting the teeth of a band saw the slots 48 are first aligned with the recess defined by the offset 35 of clip 34 and the holding fingers are adjusted so as slidably to support the run of bandsaw on each side of the positioning clip 28 which has been adjusted to receive the saw to be set. The saw is then manually manipulated to bring a tooth in operative position on the anvil 5 and the striker 8 is then struck with the hammer to set the tooth. The operation is then repeated on alternate teeth, after which the saw is reversed and the operation repeated.

If desired the device may be used for setting the teeth of a flat saw, in which case the clip 28 is removed and the position of the blocks 41 is reversed so as to bring the wider slots 46 in position to receive and support the saw blade. If necessary, the screws 45 may be operated so as to adjust the height of the slots 46 with respect to the operating surface 6 of the anvil. The setting operation is then performed in the manner above described.

It is to be understood that this disclosure is for the purpose of illustration and that various changes and modifications may be made without departing from the spirit and scope of the invention as set forth in the appended claims.

I claim:

1. A saw set comprising a base, an anvil mounted on said base, a strike pivotally mounted to swing toward and away from said anvil so as to offset a saw tooth positioned on said anvil, and saw supporting and guiding means comprising a U-shaped member adjustably mounted on said base so as to move toward said anvil with its legs positioned on each side of said anvil, guiding blocks carried by the free end portion of said legs, said blocks having horizontally extending slots aligned with each other and disposed at the same elevel as the active surface of said anvil, said slots receiving a longitudinal edge of a saw blade so that the teeth to be set extend across the active surface of said anvil, and clamping means engageable with the opposite edge of said saw blade so as to hold it in position.

2. A saw set as set forth in claim 1, wherein said guide blocks are vertically adjustable relative to the end portions of said legs.

3. A saw set as set forth in claim 1, wherein said guide blocks are reversible and their opposite faces are provided with slots of different widths so as to accommodate saw blades of different thicknesses.

4. A saw set comprising a base, an anvil mounted on said base, a strike pivotally mounted to swing toward and away from said anvil so as to offset a saw tooth positioned on said anvil, and saw supporting and positioning means comprising a U-shaped member slidably mounted on said base so as to move toward said anvil with its legs positioned on each side of said anvil, an upstanding member between said legs and inwardly of said anvil, said upstanding member having a horizontally extending plate with an outer edge contiguous and at the level of the active surface of said anvil to support one face of a saw blade so that the tooth to be set is positioned on said active surface, a clamp above said plate for engaging the opposite face of said blade to hold it firmly in position, blocks carried by the free end portions of said legs, said blocks having horizontally extending slots aligned with each other and disposed at the same level as said plate, said slots receiving a longitudinal edge of a saw blade so that the teeth to be set extend across the active surface of said anvil, and clamping means engageable with the opposite edge of said saw blade so as to hold it in position.

References Cited in the file of this patent

UNITED STATES PATENTS

| | | |
|---|---|---|
| 325,101 | Markham | Aug. 25, 1885 |
| 419,192 | Fisher | Jan. 14, 1890 |
| 504,521 | Dillon | Sept. 5, 1893 |
| 633,725 | Mahar | Sept. 26, 1899 |
| 831,693 | Wismar | Sept. 25, 1906 |
| 1,613,199 | Rockley | Jan. 4, 1927 |